United States Patent
Sadler et al.

(10) Patent No.: US 6,430,068 B1
(45) Date of Patent: Aug. 6, 2002

(54) DUAL INPUT, HOT SWAPPABLE DUAL REDUNDANT, ENHANCED N+1 AC TO DC POWER SYSTEM

(75) Inventors: Ray G. Sadler, Plano; Shaun L. Harris, McKinney, both of TX (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/940,973

(22) Filed: Aug. 28, 2001

Related U.S. Application Data

(62) Division of application No. 09/563,003, filed on Apr. 29, 2000, now Pat. No. 6,356,470.

(51) Int. Cl.[7] ............................................... H02M 7/00

(52) U.S. Cl. ........................................................ 363/65

(58) Field of Search .............................. 363/65, 67, 69, 363/70; 307/52, 53, 58, 69, 85; 395/705.01–750.08

(56) References Cited

U.S. PATENT DOCUMENTS

| | | | | |
|---|---|---|---|---|
| 5,790,839 A | * | 8/1998 | Luk et al. .................... 395/556 |
| 5,909,583 A | | 6/1999 | Hayes et al. ........... 395/750.01 |
| 5,946,495 A | | 8/1999 | Scholhamer et al. ... 395/750.01 |
| 6,153,946 A | | 11/2000 | Koch et al. .................... 307/64 |
| 6,154,845 A | | 11/2000 | Ilkbahar et al. ............. 713/300 |

* cited by examiner

Primary Examiner—Matthew Nguyen

(57) ABSTRACT

The inventive system uses modular N+1 bulk power supplies to power a computer system. Thus, the individual BPSs may be replaced while the system is on-line. Each BPS is split into two halves, with each halve being run by a separate power grid. This means that if one of the power grids goes down, the other grid fills the power. Thus, there are no switching times or latencies, the inventive power supply system keeps running. When both power grids are present, each power supply halve in a BPS load shares 50/50. The two input AC power grids are each controlled separately via two power distribution control assemblies (PDCA). Each assembly can be separately configured for 3 phase wye, 3-phase delta or single phase inputs.

20 Claims, 5 Drawing Sheets

DUAL INPUT, HOT SWAPPABLE DUAL REDUNDANT, ENHANCED N+1 AC TO DC POWER SYSTEM

RELATED APPLICATION

The instant application is a divisional application of, and claims prior to, U.S. patent application Ser. No. 09/563,003, entitled "DUAL INPUT, HOT SWAPPABLE DUAL REDUNDANT, ENHANCED N+1 AC TO DC POWER SYSTEM," now U.S. Pat. No. 6,356,470 filed Apr. 29, 2000, the disclosure of which is hereby incorporated herein by reference.

TECHNICAL FIELD

This application is related in general to power supplies, and in specific to a N+1 power supply system that can be configured for different input AC power formats.

BACKGROUND

Large, multi-processor computer systems are business enterprise servers for use by large corporations with high speed computer needs, e.g. automotive companies, large accounting firms, Internet companies, etc. Enterprise servers take large amounts of AC current from the site power, typically on the order of 10–20 kilowatts of power. Therefore, 3-phase power is usually used to power these systems. One of the major requirement for enterprise servers is what is called high availability. The meaning here is that there is the desire that there are no external events force the machine to crash. One common event that leads to a system crash is loss of the system power. This may occur as a result of a commercial power producer problem or it may originate with loss of a system power component. Note that with three phase power, the problem can be from the loss of the entire 3-phase grid, or loss of one of the three legs.

To avert such failures, enterprise server customers generally try to have an un-interruptible power supply or back-up motor generator running their systems. In this case, the un-interruptible power supply, or UPS, is always online and of course, it too can fail. What was needed, then, was a different way to ensure availability and reliability.

One typical way is to have two power grids available for the product. One power grid could be the site 3-phase power, and the other one could be an un-interruptible power supply or perhaps even a motor generator. Thus, when a failure is sensed on one of those power grids, an active switch mechanism changes the power feed to the computer product. In other words, if grid A failed, it would be sensed and grid B would be switched over into the machine. There are problems with this approach, primarily because the phase relationship between grid A and grid B must be the same. Also, the tolerances of the power should also be the same, i.e. the power supplied by both grids should have the same voltages and current levels. The biggest problem is that there is a latency time relating to that switchover. Thus, the computer may suffer a power drop during switch over, and thus may crash. Systems with such backups are referred to as N+1 systems, the N being the required number of power grids, the +1 being the backup grid.

SUMMARY OF THE INVENTION

These and other objects, features and technical advantages are achieved by a system and method which uses modular N+1 power sources. Thus, the individual power supplies, or bulk power supplies (BPSs) may be swapped out of the computer. The BPSs supply power to the computer components. The power supply system uses a plurality of BPSs according to an N+1 requirement. For example, if 5 BPSs are required to run the computer system, then 6 BPSs would be installed in the power supply system. Thus, if one BPS goes down, the remaining five can satisfy the system's power needs. This also allows the BPSs to be hot swappable, meaning that a BPS can be changed for a new one, without shutting the system down. This allows for the system to be repaired, e.g. defective BPSs can be swapped, or upgraded, e.g. a newer model replaces an older one. This also allows for repairs or modifications to be performed while the system is running, e.g. one BPS is pulled for repair/modification, while the other BPSs provide power to the system.

Each BPS is split into two halves, with each halve being run by a separate power grid. This means that if one of the power grids goes down, the other grid fills the power. Thus, there are no switching times or latencies, the inventive power supply system keeps running. When both power grids are present, each power supply halve in a BPS load shares 50/50. To make this possible, it was necessary to be able to accommodate two input power grids of basically any voltage between 176 and 284 VAC. The phase relationship of these voltages is unimportant.

The two input AC power grids are each controlled separately via two power distribution control assemblies (PDCA). Each assembly can be separately configured for 3 phase wye or 3-phase delta inputs. Each PDCA can also be separately configured to receive single phase power. Each PDCA divides the power among the BPSs. The wiring blocks used to configure the PDCA for any 3 phase wye, 3-phase delta inputs, or single phase are field configurable, and can be changed out to permit a different power input. Thus, if one power grid or PDCA goes down, the BPSs will pull their power needs from the other PDCA and grid. Thus, if one PDCA goes down, the remaining one can satisfy the system's power needs. This also allows the PDCAs to be hot swapped, meaning that a PDCA can be changed for a new one, without shutting the system down. This allows for the system to be repaired, e.g. defective PDCAs can be swapped, or upgraded, e.g. a newer model replaces an older one. This also allows for repairs or modifications to be performed while the system is running, e.g. one PDCA is pulled for repair/modification, while the other PDCA provides power to the system.

Therefore, it is a technical advantage of the present invention to be able use any form of power to supply the computer system, e.g. 3-phase delta power, 3-phase wye power, single phase power, motor generated power, or UPS power. Any of these configurations can be accommodated as either the primary and/or the backup power source.

It is another a technical advantage of the present invention to be able have a two way redundant power supply. One is AC input power redundancy, via two PDCAs. The other is DC power redundancy, via N+1 BPSs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
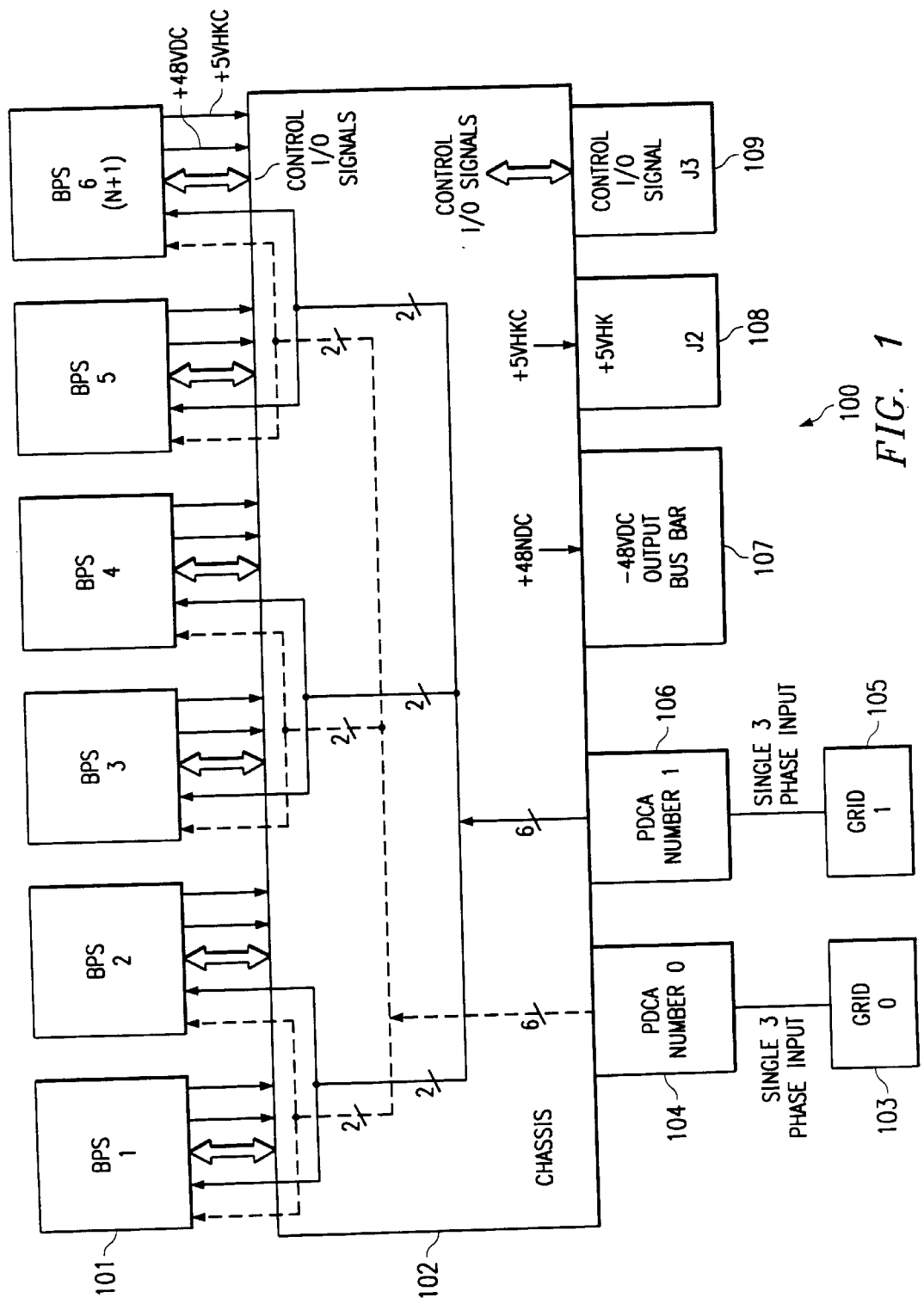
FIG. 1 depicts a functional block diagram for the preferred embodiment of the inventive power supply system.

FIG. 1 depicts a functional block diagram for the preferred embodiment of the inventive power supply system 100. In this system, six bulk power supplies (BPSs) 101 are used. Note that this number is for illustration only, as more or fewer BPSs could be used, as long as there are N+1 present. Each BPS receives power via a connecting backplane or chassis 102. The chassis 102 is connected to two power grids, 103, 105 via power distribution control assemblies (PDCAs) 104, 106. Note that each PDCA 104, 106 is feeding each BPS 101. The BPSs 101 form a 48-volt and a 5-volt DC outputs, which are provided back to the chassis 102 for distribution to other components of the system, e.g. the main computer processor boards, via buses 107, 108. Note that the voltage levels and the number of levels is by way of example only, as system requirements may have different voltage levels as well as a different number of levels.

The PDCAs 104, 106 can be field-configured to accept 3-phase delta, 3-phase wye, or single phase as the power source, depending on the grid 103, 105 being used. The phase legs of the three phase inputs are arranged such that legs, L1, L2, and L3, each feeds two BPS slots. Each BPS receives an input from each PDCA. Thus, a power loss from one of the PDCAs would only disable one-half of each BPS. Each BPS is connected to a power monitor (301 of FIG. 3) via control signals 106. These signals allow for each BPS to be powered up/down, as wells as send and receive status information. 5VHK J2 108 is a +5 volt DC output used for end-system housekeeping (HK).

Figure 2:
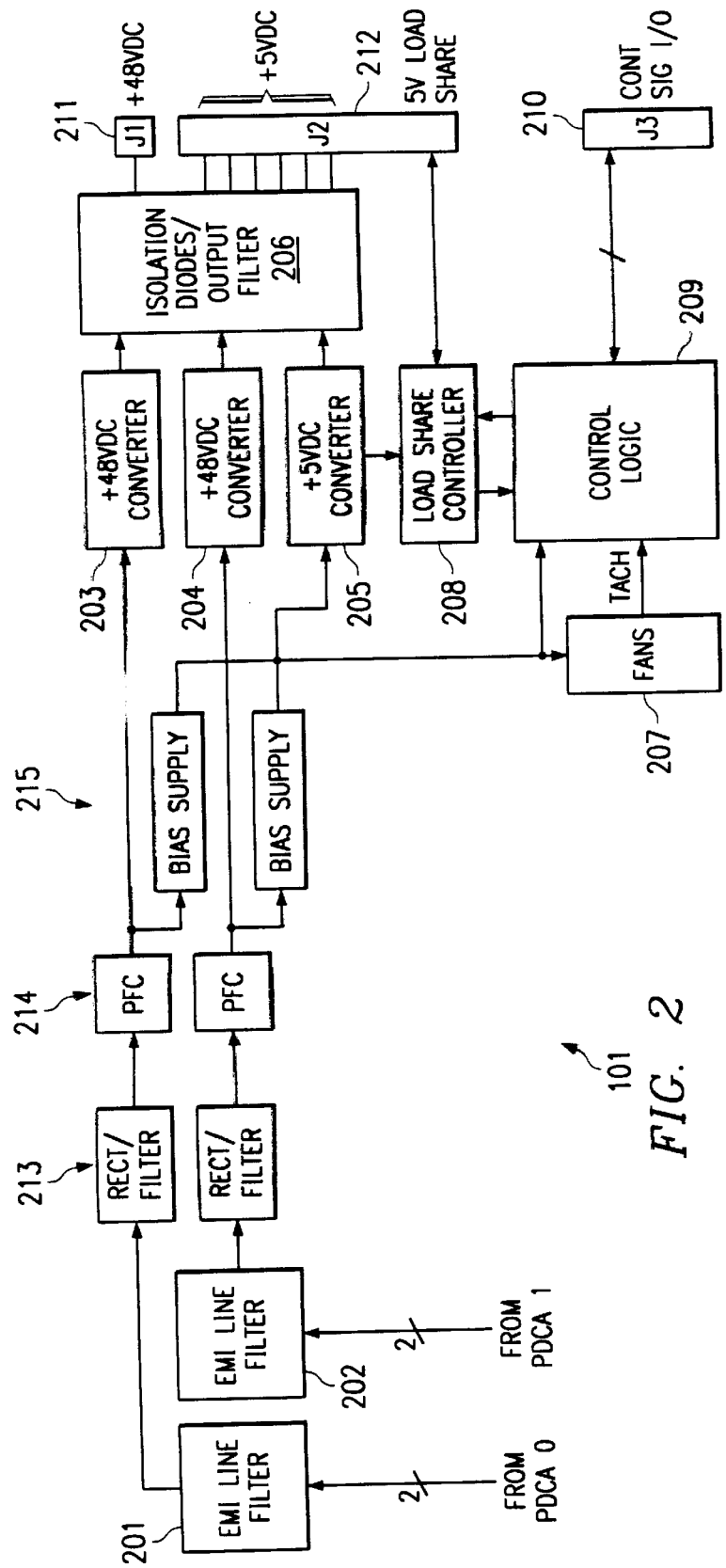
FIG. 2 depicts the functional block diagram for the preferred embodiment of a bulk power supply.

FIG. 2 depicts the functional block diagram for the preferred embodiment of a BPS 101. The BPS includes line filter blocks 201, 202 and rectifier blocks 213, 216 that receive the two AC inputs. The EMI filter portion suppresses harmonic signals from reflecting back into the AC input lines. The rectifier blocks rectify the AC input power into DC power. The filtered DC output is provided to PFC blocks 214, 217 which ensure a power factor of greater than about 0.98. Their outputs are provided to converters 203/204 for the +48 voltage level and 205 for the +5 volt level. The outputs of the converters are sent to isolation diodes/output filters 206. The isolation diodes are necessary for hot swapping and the output filter elements are capacitors. The BPS uses fans 207 to cool the BPS. Bias supplies 215, 219 supply power to the fans 207 and the control logic 209. Output terminals 211 receives the 48 volt output from the filter 206, which is then delivered back to the chassis 102. Output connector 212 receives the 5 volt output from the filter 206, which is then delivered back to the chassis 102. Load share controller 208 operates to control load sharing of the +5VHK. Control logic 209 controls the other elements of the BPS, as well as sends/receives status information to/from the power monitor 301 via connector 210. Substantially instantaneous switching without using a switch is accomplished by having two converter chains (i.e. 201, 213, 214, 203; and 202, 216, 217, 204). If one chain should drop off, the other chain sees a higher load, and then increases its power output. In other words, each chain is capable of fully satisfying the load for the BPS.

Figure 3:
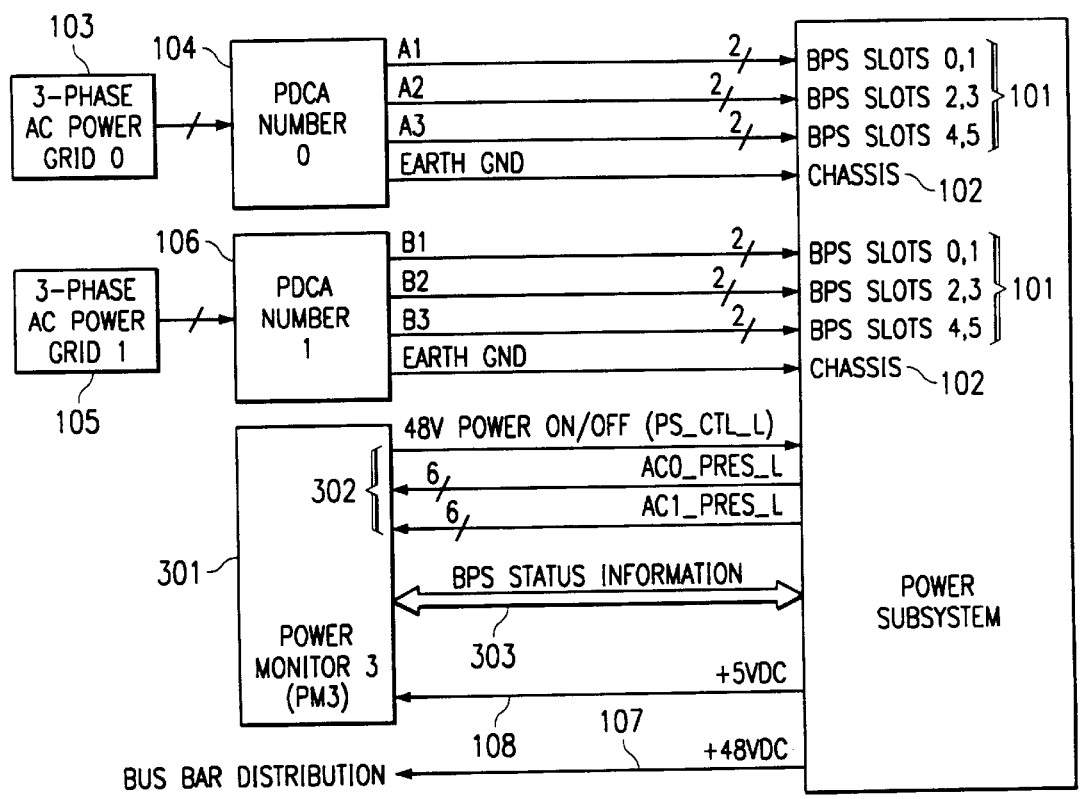
FIG. 3 depicts the functional block diagram for the preferred embodiment of a bulk power supply connection.

FIG. 3 depicts the functional block diagram for the preferred embodiment of a BPS 101 connects with PDCAs 104, 106. The power monitor 301 receives AC status information 302, BPS status information 303, as wells as send commands to the BPSs via 303. The power monitor is a consumer of the 5 volt power supply from 108. Note that the monitor 301 is not part of the BPS or power supply system, but rather is part of end-product computer system. In the depicted example, the PDCAs are provided with 3 phase AC power, which they convert into three single phase pairs. PDCA 104 (shown for delta connection) provides input pairs A1, A2, A3, and ground to the BPSs. PDCA 106 provides input pairs B1, B2, B3, and ground to the BPSs. The As and Bs are two wire pairs of AC power. Each input signal feeds two BPSs, if there are more/fewer BPSs, then each input signal would feed more/fewer BPSs. In the depicted example, the A1 pair goes to BPS slots 0 and 1, the A2 pair goes to BPS slots 2 and 3, and the A3 pair goes to BPS slots 4 and 5. Similarly, the B1 pair goes to BPS slots 0 and 1, the B2 pair goes to BPS slots 2 and 3, and the B3 pair goes to BPS slots 4 and 5. Note that this is for illustration purposes only, as different pairs of As and Bs could feed different BPS slots. Each PDCA contains wiring to convert the three phase input into three single phase outputs, where the legs, L1, L2, L3 of the three phase input are wired to the outputs A1, A2, A3, B1, B2, and B3 as follows:

|  | A1 | A2 | A3 |
| --- | --- | --- | --- |
| 3 phase delta | L1-L2 | L2-L3 | L3-L1 |
| 3 phase wye | L1-N | L2-N | L3-N |
|  | B1 | B2 | B3 |
| 3 phase delta | L1-L2 | L2-L3 | L3-L1 |
| 3 phase wye | L1-N | L2-N | L3-N |

Figure 4A:
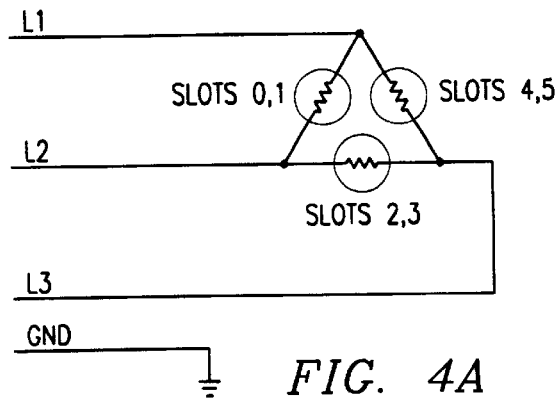
FIGS. 4A and 4B depict the wiring for three phase delta power input.
Figure 4B:
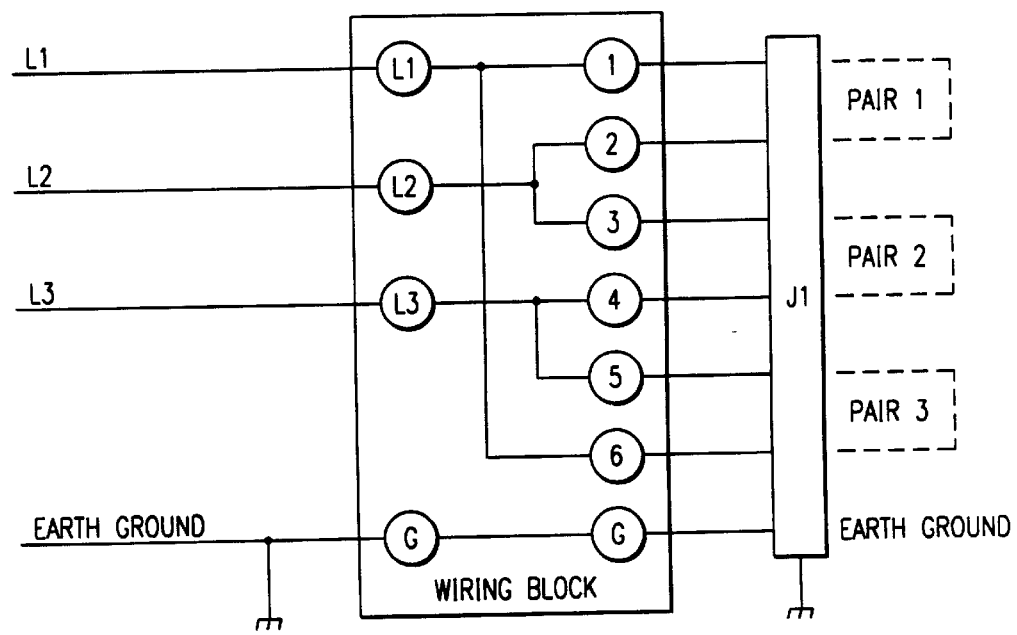
Figure 5A:
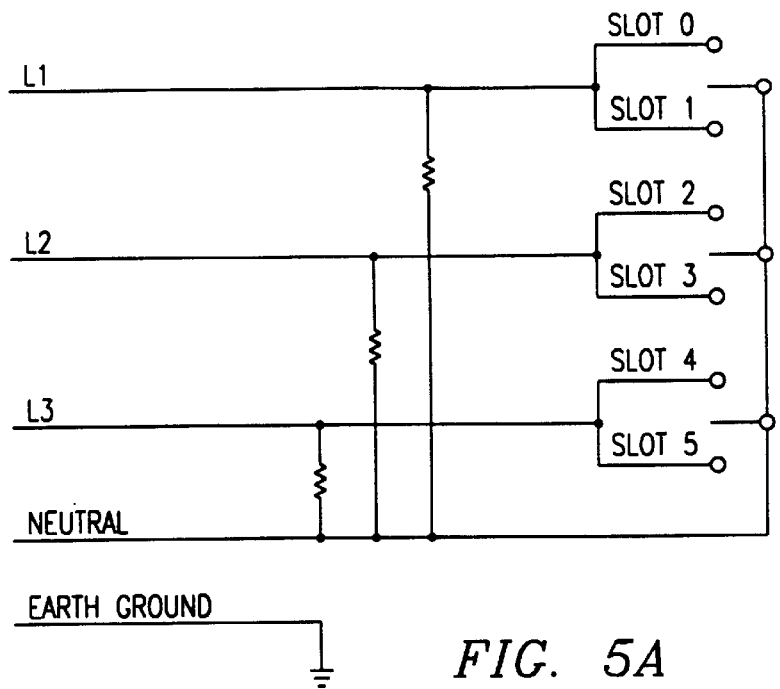
FIG. 5A and 5B depict the wiring for three phase wye power input.
Figure 5B:
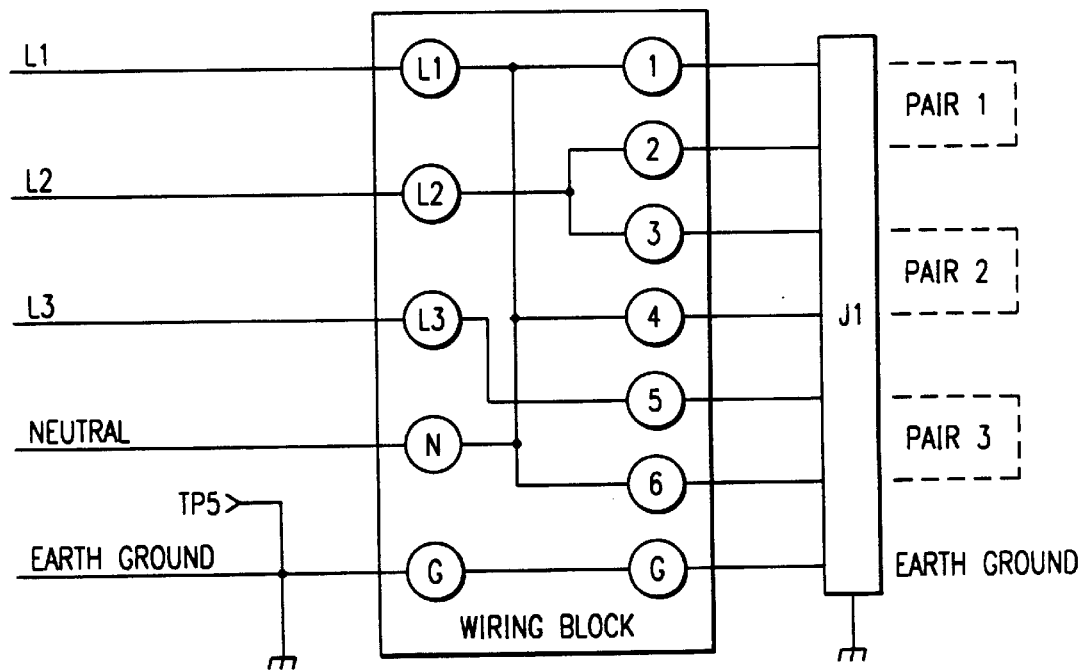

FIG. 4A depicts the wiring and slot load scheme for three phase delta power input. FIG. 4B depicts the wiring block for the three phase delta power input. Pair 1 corresponds to A1 or B1, pair 2 corresponds to A2 or B2, B3. Thus, the PDCA wires BPS slots 0 and 1 to a single-phase pair that is formed from L1 and L2, BPS slots 2 and 3 of the BPS are single-phase pair formed from L2 and L3, and BPS slots 4 and 5 are single-phase pair formed from L1 and L3. FIG. 5A depicts the wiring and slot load scheme for three phase wye power input. FIG. 5B depicts the wiring block for the three phase wye power input. Pair 1 corresponds to A1 or B1, pair 2 corresponds to A2 or B2, and pair three corresponds to A3 or B3. Thus, the PDCA wires BPS slots 0 and 1 to a single-phase pair that is formed from L1 and neutral (N), BPS slots 2 and 3 of the BPS are single-phase pair formed from L2 and N, and BPS slots 4 and 5 are single-phase pair formed from L3 and N.

The wiring blocks of FIGS. 4B and 5B can be hard wired into the PDCAs or the blocks can be formed as a programming plug which is inserted into a socket in the PDCAs, each socket would have connections for L1, L2, L3, G, 1, 2, 3, 4, 5, 6, and G. Thus, to change configurations, the current plug is removed and a different plug is inserted into the socket.

Although the invention has been described in terms of three phase power grids, 103, 104. These grids could either or both be large single phase grids. In that case, the wiring in the PDCA would be a 6 way split of the input power grid, with one line to each slot.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power distribution control assembly that receives one of three phase delta power, three phase wye power, and single phase power from a power grid and distributes the power to each of a plurality of bulk power supplies, the assembly comprising:
   a plurality of input terminals that are connected to the power grid;
   a wiring block that is connected to the input terminals and divides the power from the power grid based upon the number of bulk power supplies and the phase of the power; and
   a plurality of output terminals that receive the divided power and provides the divided power to the plurality of bulk power supplies.

2. The power distribution control assembly of claim 1 wherein:
   the received power is three phase delta; and
   the wiring block provides the first and second phases of the received power to a first portion of bulk power supplies, the second and third phases of the received power to a second portion of bulk power supplies, and the third and first phases of the received power to a third portion of bulk power supplies.

3. The power distribution control assembly of claim 1 wherein:
   the received power is three phase wye; and
   the wiring block provides the first phase and neutral of the received power to a first portion of bulk power supplies, the second phase and neutral of the received power to a second portion of bulk power supplies, and the third phase and neutral of the received power to a third portion of bulk power supplies.

4. The power distribution control assembly of claim 1 wherein:
   the received power is single phase; and
   the wiring block provides the single phase of received power to each of the bulk power supplies.

5. The power distribution control assembly of claim 1 wherein:
   the wiring block is hardwired into the power distribution control assembly.

6. The power distribution control assembly of claim 1 wherein:
   the wiring block comprises a programming plug that is connected to the power distribution control assembly via a socket.

7. The power distribution control assembly of claim 2 wherein:
   the wiring block is constructed by linking each phase of the three phase delta power to another phase of the three phase delta power across one of a set of resistive elements, whereby the plurality of output terminals receive the divided power present across said resistive elements.

8. The power distribution control assembly of claim 3 wherein:
   the wiring block is constructed by linking each phase of the three phase wye power to a neutral source across one of a set of resistive elements, whereby the plurality of output terminals receive the divided power present across said resistive elements.

9. A method of distributing power received by a plurality of input terminals from a power grid to a plurality of bulk power supplies via a plurality of output terminals connected to a wiring block, wherein the power grid supplies power in one of three phase delta, three phase wye, and single phase, the method comprising the steps of:
   connecting the plurality of input terminals from the power grid to the wiring block;
   connecting the plurality of output terminals from the wiring block to the bulk power supply;
   receiving power from the power grid, via the input terminals;
   dividing the received power based on the number of bulk power supplies and the phase of the received power via the wiring block; and
   transmitting the divided power to the bulk power supplies via the output terminals.

10. The method of claim 9 wherein the power received from the power grid is three phase delta and the step of dividing the received power further comprises the steps of:
    providing the first and second phases of the received power to a first portion of bulk power supplies;
    providing the second and third phases of the received power to a second portion of bulk power supplies; and
    providing the first and third phases of the received power to a third portion of bulk power supplies.

11. The method of claim 9 wherein the power received is three phase wye and the step of dividing the received power comprises the steps of:
    providing the first phase and neutral of the received power to a first portion of bulk power supplies;
    providing the second phase and neutral of the received power to a second portion of bulk power supplies; and
    providing the third phase and neutral of the received power to a third portion of bulk power supplies.

12. The method of claim 9 where the power received is single phase and the step of dividing the received power comprises the step of:

providing the single phase of power to each of the bulk power supplies.

13. The method of claim 9 wherein:

the wiring block is hardwired.

14. The method of claim 9 wherein:

the wiring block is comprised of a programming plug;

wherein the programming plug is connected to the output terminals via a socket interface.

15. A system that distributes power to a set of bulk power supplies comprising of:

means for receiving power from a power grid;

means for dividing the received power based on the number of bulk power supplies and the phase of the power; and means for transmitting the divided power to the bulk power supplies.

16. The system of claim 15 which further comprises:

means for field configuring the system so as to utilize power in one form of three phase wye, three phase delta and single phase power.

17. The system of claim 15 wherein the received power is three phase delta and the system is further comprised of:

means for providing the first and second phases of the received power to a first portion of bulk power supplies;

means for providing the second and third phases of the received power to a second portion of bulk power supplies; and means for providing the first and third phases of the received power to a third portion of bulk power supplies.

18. The system of claim 15 wherein the received power is three phase wye and the system is further comprised of:

means for providing the first phase and neutral of the received power to a first portion of bulk power supplies;

means for providing the second phase and neutral of the received power to a second portion of bulk power supplies; and means for providing the third phase and neutral of the received power to a third portion of bulk power supplies.

19. The system of claim 15 wherein the received power is single phase and the system is further comprised of:

means for providing the single phase of power to each of the bulk power supplies.

20. The system of claim 15 wherein the means for dividing the received power based on the number of bulk power supplies and the phase of the power comprises:

a hard wired wiring block.

* * * * *